No. 777,238. PATENTED DEC. 13, 1904.
J. M. BRISCOE.
NUT WRENCH.
APPLICATION FILED DEC. 23, 1903.
NO MODEL.
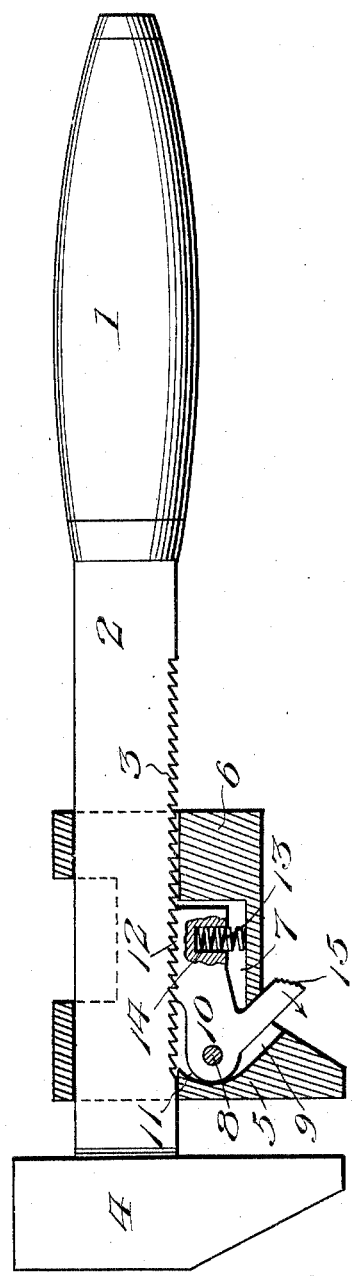
Witnesses
Edwin F. McKee
Herbert B. Lawson.
Inventor
Joseph M. Briscoe
By Victor J. Evans
Attorney No. 777,238. Patented December 13, 1904.

UNITED STATES PATENT OFFICE.

JOSEPH M. BRISCOE, OF MARSHALL, TEXAS.

NUT-WRENCH.

SPECIFICATION forming part of Letters Patent No. 777,238, dated December 13, 1904.

Application filed December 23, 1903. Serial No. 186,373. (No model.)

*To all whom it may concern:*

Be it known that I, JOSEPH M. BRISCOE, a citizen of the United States, residing at Marshall, in the county of Harrison and State of Texas, have invented new and useful Improvements in Nut-Wrenches, of which the following is a specification.

My invention relates to new and useful improvements in nut-wrenches; and its object is to provide a simple, compact, and inexpensive device of this character which is durable in construction and which can be readily adjusted to fit nuts of different sizes.

With the above and other objects in view the invention consists of a toothed shank on which is slidably mounted a recessed jaw. A dog is pivoted within the jaw and bears at one end against one wall of the recess therein, and this dog has teeth which are held normally in contact with the teeth on the shank by means of a spring located within the jaw. An arm is formed integral with the dog and extends at an angle thereto from the sliding jaw and into position where it may be readily depressed to release the dog from engagement with the shank.

The invention also consists in the further novel construction and combination of parts hereinafter more fully described and claimed, and illustrated in the accompanying drawing, which is a side elevation of my improved wrench, the sliding jaw being shown in section.

Referring to the drawing by numerals of reference, 1 is a handle having a shank 2 extending therefrom. Ratchet-teeth 3 are formed upon one edge of the shank and a fixed head 4 is located at the outer end of said shank. Slidably mounted upon the shank 2 is a jaw 5, formed at one end of a sleeve 6, which incloses the shank. This sleeve has a recess 7 therein, and a pivot-pin 8 extends through one end of the recess and adjacent an aperture 9, which is formed within the rear face of the jaw 5 and communicates with the recess. Pivoted on the pin 8 is a dog 10, and this dog has one end curved, as shown at 11, and bearing at all times against one wall of the recess 7. Teeth 12 are provided on the inner face of the dog 10 and are held normally in engagement with the teeth on the shank by means of a coiled spring 13, which is seated in a recess 14 in the dog and bears against one wall of the recess 7. An arm 15 is formed integral with the dog and extends through the aperture 9. The outer end of this arm is milled or roughened in any suitable manner, so as to be readily engaged by a finger of the person using the wrench. The pivot 8 is so located that the toothed portion of the dog is normally parallel to and in engagement with the shank 2. The teeth 12 are so shaped as to slip over the teeth 3 when the jaw 5 is moved toward the jaw 4; but reverse movement of the jaw is prevented by the teeth. When it is desired to adjust the jaws from each other, it is merely necessary to press one finger against the end of arm 15, so as to swing the toothed portion of the dog away from the shank and compress the spring 13. Said jaw can then be moved longitudinally in either direction upon shank 2, and when the arm 15 is released the dog will be sprung into engagement with the shank and further backward movement of the jaw 5 prevented. It will be seen that all strain upon the pivot-pin 8 is relieved by the end of wall of the recess 7, which forms a bearing for the curved end 11 of dog 10.

The wrench is compact and durable in construction and is formed of few parts.

In the foregoing description I have shown the preferred form of my invention; but I do not limit myself thereto, as I am aware that modifications may be made therein without departing from the spirit or sacrificing any of the advantages thereof, and I therefore reserve the right to make such changes and alterations as fairly fall within the scope of my invention.

Having thus fully described my invention, what I therefore claim as new, and desire to secure by Letters Patent, is—

In a wrench, the combination with a toothed shank having a fixed jaw thereon; of a sleeve slidably mounted upon the shank and having a recess therein, a jaw at one end of and integral with the sleeve, said jaw having a recess in one face opening into the recess in the sleeve, and an aperture extending into the recess in the jaw, a pivot-pin extending laterally through the recess in the jaw, a dog pivoted upon said pin and having a rounded end bearing against the inner wall of the recess in the jaw, teeth upon the dog adjacent its other end, a spring seated within a recess in the dog adjacent said end and bearing upon wall of the recess in the sleeve, said spring being adapted to hold the teeth on the dog normally in engagement with the teeth on the shank, and an arm integral with the dog and projecting from the fulcrumed end thereof and through the aperture, all portions of said arm and dog being in alinement with the jaws and shank.

In testimony whereof I affix my signature in presence of two witnesses.

JOSEPH M. BRISCOE.

Witnesses:
　Jos. NEWMAN,
　E. C. WHALEY.